Patented Feb. 6, 1923.

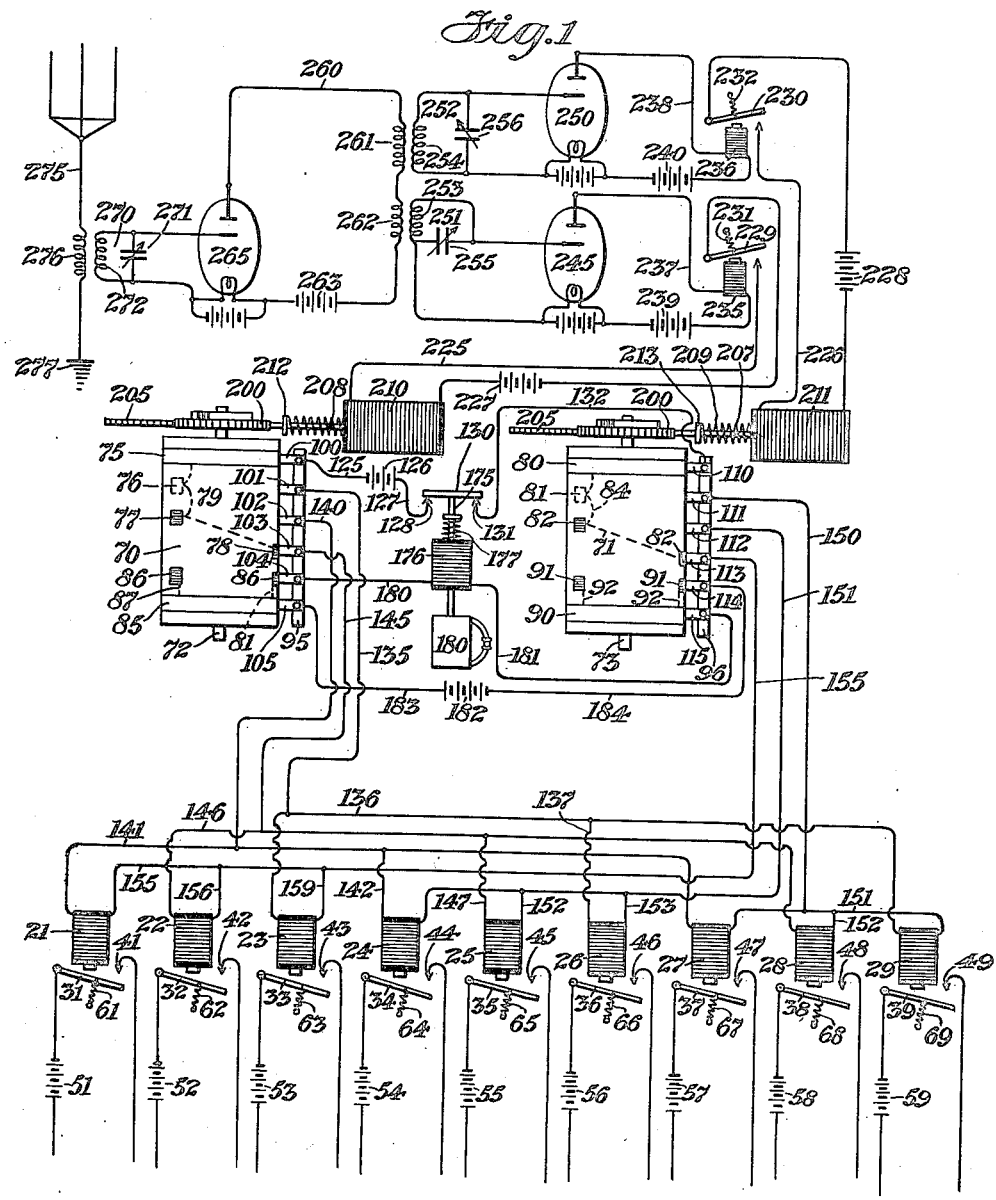

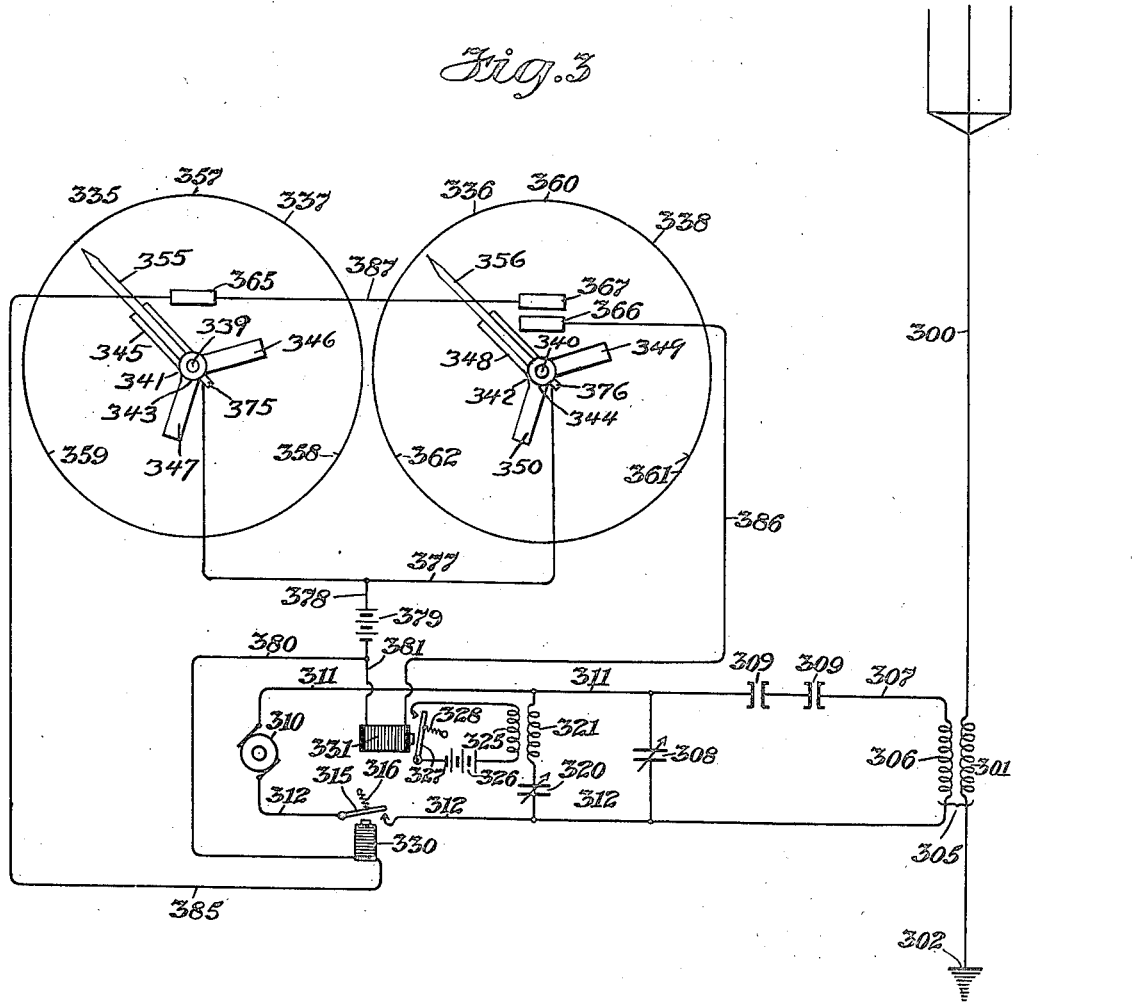

1,444,417

UNITED STATES PATENT OFFICE.

JOHN HAYS HAMMOND, JR., OF GLOUCESTER, MASSACHUSETTS.

MULTIPLEX SYSTEM IN TELEDYNAMIC CONTROL.

Application filed October 17, 1917, Serial No. 197,126. Renewed June 28, 1922. Serial No. 571,474.

*To all whom it may concern:*

Be it known that I, JOHN HAYS HAMMOND, Jr., a citizen of the United States, and a resident of Gloucester, in the county of Essex and State of Massachusetts, have invented certain new and useful Improvements in Multiplex Systems in Teledynamic Control, of which the following is a specification.

Some of the objects of this invention are to provide a system for controlling a plurality of separately operable devices selectively from a distance in response to radiant energy, and in which each of the controlled devices is arranged to be controlled by the conjoint action of a plurality of separately movable commutators or controlling elements which are in turn separately controlled in response to radiant energy; to provide an improved multiplex receiving system for radiant energy; to provide an improved multiplex transmission system for radiant energy; and to provide other improvements as will appear hereinafter.

In the accompanying drawings, Fig. 1 is a diagrammatic side elevation of a receiving system constructed in accordance with this invention; Fig. 2 an end elevation of a portion of the same; and Fig. 3 a diagrammatic side elevation of a transmission system constructed in accordance with this invention.

One form of multiplex receiving system constructed in accordance with this invention comprises, as shown in Figs. 1 and 2, a plurality of fixed electro-magnets 21 to 29 inclusive which are arranged to control switches 31 to 39 respectively which are pivoted to oscillate in front of the magnets 21 to 29 respectively and into and out of engagement with corresponding fixed contacts 41 to 49 respectively to control circuits containing batteries 51 to 59 respectively, the switches 31 to 39 being normally held open by corresponding springs 61 to 69 to keep the circuits through the batteries 51 to 59 normally open, and the circuits through the batteries 51 to 59 being arranged to separately control a corresponding number of functioning elements or mechanisms (not shown), such as the steering mechanism of an aircraft or boat or other movable body, the propelling motor, a searchlight, or any other functioning devices carried by the movable body or otherwise positioned.

For selectively energizing the electromagnets 21 to 29 to control the corresponding circuits a primary cylindrical commutator 70 and a secondary cylindrical commutator 71 are provided. These two commutators 70 and 71 are mounted upon and rigidly secured to two shafts 72 and 73 coaxial therewith respectively and which are arranged to be separately rotated selectively step by step in the same direction about fixed axes in response to radiant energy to rotate the commutators accordingly, as will appear hereinafter. The primary commutator 70 is provided at one end with a main conducting ring 75, and is also provided with three main contacts 76, 77 and 78 which are equispaced, each contact being in advance of the preceding contact 120°, and which are preferably equi-spaced longitudinally of the commutator. These three main contacts are electrically connected together and to the main ring 75 by a suitable conductor 79 which is depressed below the cylindrical surface of the commutator in a recess or conduit provided therefor. The secondary commutator 71 is also provided at one end with a main conducting ring 80 and is provided with three main contacts 81, 82 and 83 which are equi-spaced circumferentially of the commutator, each contact being 120° in advance of the preceding contact, and which are preferably equi-spaced longitudinally of the secondary commutator. These main contacts 81, 82 and 83 are connected together and to the main ring 80 by a conductor 84 which is depressed below the surface of the commutator 71 in a recess provided therefor.

The primary commutator 70 is also provided with an auxiliary conducting ring 85 and with three auxiliary contacts 86 arranged in a row parallel to the conducting ring 85 and in alinement respectively with the main contacts 76, 77 and 78. These auxiliary contacts 86 are electrically connected respectively by suitable conductors 87 to the auxiliary ring 85. The secondary commutator 71 is also provided with an auxiliary conducting ring 90 and with three auxiliary contacts 91 which are arranged in a row parallel to the auxiliary ring 90 and in longitudinal alinement respectively with the main contacts 81, 82 and 83 of the secondary commutator 71. These auxiliary contacts 91 are electrically connected to the auxiliary ring 90 by means of suitable conductors 92. For cooperating with the primary and secondary commutator 70 and 71 a fixed primary brush-bar 95 and a fixed secondary brush bar 96 are arranged adjacent and parallel to the two commutators 70 and 71 respectively. Rigidly secured to but insulated from the primary brush-bar 95 are a series of six primary brushes 100 to 105 which slidably engage the cylindrical surface of the primary commutator 70 and which are arranged to cooperate respectively with the main ring 75 and three main contacts 76, 77 and 78, the series of auxiliary contacts 86 and the auxiliary ring 85. Rigidly secured to but insulated from the secondary brush-bar 96 are a series of six secondary brushes 110 to 115 which slidably engage the cylindrical surface of the secondary commutator 71 and which are arranged to cooperate with the main ring 80, the main contacts 81, 82 and 83, the series of auxiliary contacts 91 and the auxiliary ring 90 respectively of the secondary commutator 71.

The brush 100 which contacts with the main ring 75 of the primary commutator 70 is connected by a conductor 125 to one pole of a battery 126, the other pole of which is connected by a conductor 127 to a fixed contact 128 which is normally engaged by one end of a reciprocatory switch element 130 which is arranged to delay the action of the battery 126, as will appear hereinafter, and which normally engages at its other end a fixed contact 131 which is connected by a conductor 132 to the brush 110 which engages the main ring 80 of the secondary commutator 71. The brush 101 of the primary commutator 70 is connected by a conductor 135 with a conductor 136 which is terminally connected to corresponding ends of the windings of the two electro-magnets 23 and 29 and which is also connected by a branch conductor 137 to a corresponding end of the winding of the electro-magnet 26. The brush 102 of the primary commutator 70 is connected by a conductor 140 to a conductor 141 which is terminally connected to corresponding ends of the windings of the two electro-magnets 21 and 27, and which is also connected by a branch conductor 142 to a corresponding end of the winding of the electro-magnet 24. The brush 103 of the primary commutator 70 is connected by a conductor 145 to a conductor 146 which is terminally connected to corresponding ends of the windings of the two electro-magnets 22 and 28, and which is connected by a branch conductor 147 with a corresponding end of the winding of the electro-magnet 25. The brush 111 of the secondary commutator 71 is connected by a conductor 150 with a conductor 151 which is terminally connected to corresponding ends of the windings of the two electro-magnets 27 and 29 and which is connected by a branch conductor 152 to a corresponding end of the winding of the electro-magnet 28. The brush 112 of the secondary commutator 71 is connected by a conductor 151 to a corresponding end of the winding of the electro-magnet 24, and by the conductor 151 and branch conductors 152 and 153 to the corresponding ends of the two electro-magnets 25 and 26. The brush 113 of the secondary commutator 71 is connected by a conductor 155 to a corresponding end of the winding of the electro-magnet 21, and by the conductor 155 and branch conductors 156 and 157 to corresponding ends of the windings of the electro-magnets 22 and 23.

For delaying the action of the battery 126 so as to permit either of the commutators 70 or 71 to be rotated quickly through any predetermined position without effecting the energization of the corresponding one of the electromagnets 21 to 29 and so that it will be necessary to permit the commutators 70 and 71 to remain in predetermined positions for a predetermined and appreciable period in order to effect the energization of the corresponding one of the electro-magnets 21 to 29, the hereinbefore mentioned switch member 130 is rigidly secured upon the outer end of a rod 175 which forms a core for a fixed solenoid 176 and which is arranged to be normally pressed outwardly with respect to the solenoid 176 by means of a spiral spring 177 which surrounds the rod 175 between the solenoid 176 and a collar 178 which surrounds and is rigidly secured to the rod 175. When the solenoid 176 is energized the rod 175 is drawn inwardly against the action of the spring 177 and holds the switch member 130 in engagement with the two contacts 128 and 131 to close the circuit through the battery 126. A fixed dash-pot 180 of any suitable construction is operatively connected to the rod 175 in such a manner as to delay the inward movement of the rod 175 with respect to the solenoid 176 to close the circuit through the battery 126, but permits of the free outward movement of the rod 175 under the action of the spring 177 to open the circuit. One end of the winding of the solenoid 176 is connected to the brush 104 of the primary commutator 70 by a conductor 180 and the other end of the winding of the solenoid 176 is connected to the brush 114 of the secondary commutator 71 by a conductor 181. The brush 105 of the primary commutator 70 is connected by a conductor 183 to one pole of a battery 182 the other pole of which is connected by a conductor 184 to the brush 115 of the secondary commutator 71.

For separately rotating each commutator 70 or 71 step by step in the same direction through 120° at each step in response to radiant energy, each of the commutators is provided with a gear 200 which is loosely mounted upon the corresponding shaft 72 or 73 and which carries pivotally secured thereto a spring-pressed pawl 201 which is arranged to engage a ratchet 202 which is rigidly secured to the corresponding shaft 72 or 73 and which is provided with three teeth 203 suitably arranged to cause the corresponding commutator to cooperate properly with the corresponding brushes so that when the commutator is in any one of its predetermined positions of rotation, one of the corresponding main contacts 76, 77 and 78 or 81, 82 and 83 will be in engagement with the corresponding brush and so that at the same time one of the auxiliary contacts 86 or 91 will be in engagement with the corresponding brush 104 or 114. Each gear 200 is engaged by a rack 205 which is arranged to reciprocate in a fixed path and which is arranged to be moved in a fixed path. The two racks 205 are connected respectively to the cores 206 and 207 of two fixed solenoids 210 and 211. The two cores 206 and 207 are surrounded by two spiral springs 208 and 209 which are normally compressed respectively between the corresponding solenoids 210 and 211 and two collars 212 and 213 which surround and are rigidly secured to the corresponding cores 206 and 207 and which normally hold the racks 205 in their outermost positions with respect to their corresponding solenoids 210 and 211. When either of the solenoids 210 or 211 is energized the corresponding rack 205 will be drawn inwardly towards the corresponding solenoid 210 or 211 to rotate the corresponding commutator 70 or 71 through 120°, and when either of the solenoids 210 or 211 is deenergized the corresponding rack 205 will be permitted to be moved outwardly under the action of the corresponding spring 208 or 209 into its outermost position without changing the position of the corresponding commutator 70 or 71.

For selectively energizing the solenoids 210 and 211 in response to radiant energy these solenoids are in two normally open circuits 225 and 226 which are arranged to be energized respectively by two batteries 227 and 228 and to be controlled by two switches 229 and 230 which are pivoted to swing about fixed axes and which are normally held open by two spiral springs 231 and 232, respectively. The two switches 229 and 230 are arranged to be controlled by two fixed electromagnets 235 and 236 which are arranged respectively in two circuits 237 and 238 which are arranged to be energized respectively by two batteries 239 and 240 and to be controlled by two detectors 245 and 250 which for convenience may be referred to hereinafter as the secondary detectors 245 and 250, and which are of any well known or suitable construction. These two detectors 245 and 250 are arranged to be controlled by two closed oscillatory circuits 251 and 252 containing respectively two coils 253 and 254 and variable condensers 255 and 256. These two closed circuits 251 and 252 are preferably tuned to respond to two different frequencies respectively, for instance to frequencies of 20,000 per second and 15,000 per second, and are arranged to be controlled selectively by a circuit 260 which includes the two coils 261 and 262 and which is arranged to be energized by a battery 263 and to be controlled by a detector 265 of any well known or suitable construction, which may be referred to hereinafter as the primary detector. The two coils 261 and 262 are inductively connected to the two coils 254 and 253 of the closed circuits 252 and 251.

The primary detector 265 is arranged to be controlled by a closed oscillatory circuit 270 which includes a variable condenser 271 and a coil 272, and which is arranged to be controlled by an open aerial circuit including an antenna 275 and a coil 276 which is inductively connected to the coil 272 of the closed circuit 270, and which is grounded as at 277. The closed circuit 270 is tuned to respond to the natural frequency of oscillation of the open aerial circuit 275, 276, 277 which is adjusted as may be desired, say to 100,000 per second.

The improved receiving system shown in Fig. 1 and just described may be controlled by any suitable system or systems for the transmission of radiant energy in the form of two series of oscillations, which may be transmitted either selectively or simultaneously, both of which have a predetermined high wave frequency corresponding to the natural frequency of oscillation of the open aerial receiving circuit 275, 276, 277, and which have respectively two secondary frequencies which correspond respectively to the secondary frequencies to which the two closed oscillatory circuits 251 and 252 controlling the secondary detectors 245 and 250 are tuned.

In the operation of the improved receiving systems shown in Fig. 1 the electro-magnets 21 to 29 may be controlled separately and selectively in any desired order by correspondingly positioning the two commutators 70 and 71 rotatably in response to suitable impulses of radiant energy. It is thought to be evident from the foregoing that when an impulse of radiant energy is received by the open aerial circuit 275, 276, 277 which has a high wave frequency equal to or corresponding to the natural frequency of oscillation of the open aerial circuit 275, 276, 277 and having a secondary frequency equal to or corresponding to the frequency to which the corresponding closed oscillatory circuit 251 which ultimately controls the primary commutator 70 is tuned, this impulse will cause the operation of the primary detector 265 and also the operation of the secondary detector 245 which will cause the energization of the corresponding electro-magnet 235 in the controlled circuit to close the circuit 225 through the solenoid 210 which will draw the corresponding rack 205 inwardly and rotate the primary commutator 70 through one step. When an impulse of radiant energy having a suitable high wave frequency and a secondary frequency equal to or corresponding to the frequency of the closed circuit 252 which controls the secondary detector 250 is received by the open aerial circuit 275, 276, 277, the primary detector 265 will be operated and will cause the operation of the secondary detector 250 which will cause the energization of the electro-magnet 236 which will close the circuit through the solenoid 211 to rotate the secondary commutator 71 through one step. When the primary commutator 70 is in any one of its three predetermined positions it may control any one of three of the nine electro-magnets 21 to 29, depending upon the position of the secondary commutator 71, and it is evident that the maximum number of steps through which it might be necessary to rotate either commutator in order to cause the energization of any particular one of the nine electro-magnets 21 to 29 would be two steps, and consequently the maximum number of commutator steps which might be necessary at a given time to effect the energization of a particular one of the nine electro-magnets 21 to 29 would be two steps of one commutator and two steps of the other commutator. It is therefore evident that this invention provides a means for controlling a large number of devices separately and selectively in response to radiant energy and in quick succession and as the result of comparatively few preliminary movements.

For the convenient operation of the improved receiving system shown in Fig. 1 this invention provides an improved transmission system, one embodiment of which comprises, as shown in Fig. 3, an open transmission circuit including an antenna 300 and a coil 301 and which is grounded through the coil as at 302. The coil 301 forms the secondary of a transformer 305 which has a primary coil 306 which is in a closed oscillatory circuit 307 which includes a variable condenser 308 and two spark-gap devices 309. The closed circuit 307 is arranged to be energized by means of a high voltage direct current generator 310 or other suitable source of direct current, one pole of which is connected by a conductor 311 to one side of the variable condenser 308, and the other pole of which is connected by a conductor 312 to the other side of the variable condenser 308, the conductor 312 being controlled by a switch 315 which is arranged to swing about a fixed axis and which is normally held open by a spiral spring 316.

When the switch 315 is closed, the generator 310 causes the closed circuit 307 through the coil 306 and variable condenser 308 to oscillate in such a manner as to cause the open aerial circuit 300, 301, 302 to oscillate in its natural period and to emit radiant oscillations having a corresponding high frequency, say for instance of 100,000 per second, the length of the open transmission circuit 300, 301, 302 being suitably adjusted to produce the required high frequency necessary to cause a response on the part of the open aerial circuit 275, 276, 277 of the hereinbefore described receiving system.

For impressing upon the high frequency oscillations transmitted by the open aerial circuit 300, 301, 302, oscillations of a variable secondary frequency, for instance oscillations having a secondary frequency either of 20,000 per second or of 15,000 per second, a tone circuit including a variable condenser 320 and a coil 321 is connected in parallel with the hereinbefore described variable condenser 308 and is suitably tuned to act upon the closed oscillatory circuit 306, 307, 308, in such a manner as to impress upon the open aerial transmission circuit 300, 301, 302 suitable oscillations, say of 20,000 per second, to superimpose these oscillations upon the high frequency oscillations radiated by the open aerial circuit 300, 301, 302. For modifying the secondary frequency of the radiant oscillations emitted, a coil 325 is inductively connected to the coil 321 of the tone circuit 320, 321, and is arranged in a normally open circuit including a battery 326 and a switch 327 which is arranged to swing about a fixed axis and which is normally held open by a spiral spring 328. When the switch 327 is closed, the current passing from the battery 326 through the coil 325 acts inductively upon the coil 321 of the tone circuit 320 and 321 and varies the natural period of oscillation of the tone circuit in such a manner as to change in a predetermined manner the secondary frequency of the waves radiated by the open aerial circuit 300, 301, 302, for instance to change the secondary frequency from 20,000 per second to 15,000 per second to correspond to the frequency of the corresponding receiving circuit.

For conveniently controlling the transmission of radiant oscillations by the open transmission circuit 300, 301, 302 and for selectively controlling the secondary frequency of the waves transmitted, the switches 315 and 327 are arranged to be controlled by the two fixed electro-magnets 330, 331 which are arranged to be controlled by a main switch 335 and an auxiliary switch 336 which include two fixed dials 337 and 338, coaxial with which respectively are two fixed pivots 339 and 340. Snugly surrounding but insulated from the two pivots 339 and 340 are two rotatable switch members 341 and 342 which include respectively two cylindrical hubs 343 and 344 radiating from and integral with each of which are three equi-spaced conducting arms 345, 346, 347 and 348, 349, 350, the angle between the longitudinal axes of any two succeeding arms being approximately 120°. Rigidly secured to the two hubs 343 and 344 and extending therefrom in the direction of the two corresponding arms 345 and 348 are two pointers 355 and 356, the outer ends of which are arranged to cooperate with equi-spaced marginal graduations 357, 358 and 359, and 360, 361 and 362 provided therefor on the two dials 337 and 338. A stationary contact 365 is secured to the dial 337 of the main switch 335 and is arranged to be slidably engaged successively by the outer ends of the arms 345, 346 and 347 of the corresponding switch member 341, and two stationary contacts 366 and 367 are secured to the dial 338 of the auxiliary switch 336 and are arranged to be slidably engaged simultaneously by the outer ends of the arms 348, 349, 350 of the corresponding switch member 342, acting in succession.

For electrically connecting the main switch 335 and the auxiliary switch 336 to the two electro-magnets 330 and 331, two stationary brushes 375 and 376 are slidably engaged by the two hubs 343 and 344 and are connected by a conductor 377 which is connected by a branch conductor 378 with one pole of a battery 379 the other pole of which is connected by a conductor 380 and branch conductor 381 to corresponding ends of the windings of the two electro-magnets 330 and 331 respectively, and the other ends of these windings are connected by two conductors 385 and 386 to the fixed contact 365 of the main switch 335 and to the fixed contact 366 of the auxiliary switch 336. The other fixed contact 367 of the auxiliary switch 336 is connected by a conductor 387 to the fixed contact 365 of the main switch 335.

In the operation of the transmission system shown in Fig. 3 and just described, when the pointer 355 of the main switch 335 is in the position shown in the drawing or upon either of the graduations 358 or 359, the circuit will be closed through the battery 379 and electro-magnet 330 and thus cause the closed oscillatory circuit 306, 308, 309 and the tone circuit 320 and 321 to be energized by the generator 310 to cause the open aerial circuit 300, 301, 302 to transmit electroradiant oscillations having a predetermined high frequency for instance of 100,000 per second and having a secondary frequency determined by the tone circuit 320, 321 of say 20,000. When the pointer 355 of the main switch 335 is in any one of its neutral positions between the graduations 357, 358, 359, the circuit through the battery 379 and electro-magnet 330 will be broken and will permit the electro-magnetic switch 315 to be opened by the spring 316 to break the circuit through the generator 310 and therefore consequently to render the transmission system inoperative. When the pointer 356 of the auxiliary switch 336 is upon either of the graduations 360, 361 or 362, the circuit will be closed through the battery 379 and the electro-magnets 330, 331, and the electro-magnet 331 will act upon its switch 327 to close the circuit through the battery 326 and the coil 325 and thus modify the period of oscillation of the tone circuit 320, 321, and when the pointer 356 of the auxiliary switch 336 is between any two succeeding graduations 360, 361, 362, so that the switch member 342 is not in engagement with either of the fixed contacts 366 and 367, then the circuit through the electro-magnets 330, 331 will be broken and no energy will be radiated.

In the operation of this invention the two pointers 355 and 356 are never permitted to make contact and close their respective circuits at the same time. First one pointer is turned through the desired number of steps and then left in a neutral position and then the other pointer is turned through the desired number of steps and left in a neutral position. It is therefore thought to be evident that when both switches 335 and 336 are open no oscillations will be radiated by the open transmission circuit 300, 301, 302, but when the main switch 335 is closed, as shown in the drawing, the open aerial circuit 300, 301, 302 will be caused to radiate a series of oscillations having a predetermined high frequency, say for instance of 100,000 per second and a predetermined secondary frequency, for instance of 20,000 per second, and when the auxiliary switch 336 is closed the open aerial circuit 300, 301, 302 will radiate oscillations having the same high frequency as before but having a modified secondary frequency, say for instance of 15,000 per second. By suitably manipulating the pointers 355 and 356, the relative positions of the two commutators 70 and 71 of the receiving system will be indicated by the pointers upon their respective dials. It is therefore evident that by suitably manipulating the pointers 355 and 356 of the transmission system any one of the electro-magnets 21 to 29 of the receiving station may be selectively energized to energize the corresponding functioning mechanism or device.

Although only a single system has been shown in which this invention may be embodied, it is to be understood that the invention is not limited to any specific system but might be embodied in various systems without departing from the spirit of the invention or the scope of the appended claims.

Having thus fully described my invention, I claim:

1. The combination with a plurality of separately operable devices, of a plurality of separately rotatable commutators jointly operative to control said devices selectively, and means responsive to radiant energy for rotating said commutators separately step by step.

2. The combination with a plurality of separately operable devices, of a plurality of separately rotatable commutators jointly operative to control said devices selectively, and means responsive to radiant energy and including a plurality of differently tuned elements respectively operative to rotate said commutators.

3. The combination with a plurality of separately operable devices, of a plurality of separately movable commutators jointly operative to control said devices selectively, and means responsive to radiant energy for selectively moving said commutators, said means comprising a plurality of differently tuned elements operative to move said commutators respectively, and a receiving element tuned to a frequency different from any of said first-mentioned frequencies and arranged to respond to radiant energy to control said first-mentioned elements selectively.

4. The combination with a plurality of separately operable devices, of a plurality of separately movable elements jointly operative to control said devices selectively, a plurality of separately operative secondary detectors arranged to control said elements respectively, a primary detector arranged to control said secondary detectors selectively, and means responsive to radiant energy for controlling said primary detector.

5. In a system of remote control, a receiving system tuned to a predetermined high frequency and having a pair of resonant circuits each tuned to a different secondary frequency and means for controlling said receiving system comprising a main contact making device, an auxiliary contact making device, means controlled by either of said devices for emitting radiant oscillations of said high frequency, means for impressing on said high frequency oscillations a periodic amplitude variation of a frequency less than said high frequency and means controlled only by the auxiliary device for modifying the amplitude variations to a different frequency less than said high frequency, said lesser frequencies corresponding to the frequencies to which said resonant circuits are tuned.

6. In a system of remote control, a receiving system having elements tuned to a predetermined high frequency and to a plurality of secondary frequencies respectively, and control means comprising a plurality of manually operable devices, one of said devices being arranged to emit oscillations of a predetermined high frequency modified by periodic variations of one of the secondary frequencies, and the remainder being arranged to emit oscillations of a predetermined high frequency modified by periodic variations of other secondary frequencies.

7. A selective signaling system comprising a plurality of operating devices arranged in groups, control mechanism for each of said groups, a tuned circuit including means for operating said control mechanism, and means responsive to electromagnetic oscillations of a predetermined high frequency having impressed thereon variations of a lesser frequency and means for selectively actuating one of said tuned circuits in accordance with the secondary frequency.

Signed at New York in the county of New York and State of New York this 9th day of October, A. D. 1917.

JOHN HAYS HAMMOND, Jr.